United States Patent
Pigg (10) Patent No.: US 11,908,085 B2
(45) Date of Patent: Feb. 20, 2024

(54) ENTROPY-DEPENDENT ADAPTIVE IMAGE FILTERING

(71) Applicant: Siemens Medical Solutions USA, Inc., Malvern, PA (US)

(72) Inventor: David Pigg, Maryville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 454 days.

(21) Appl. No.: 17/443,827

(22) Filed: Jul. 28, 2021

(65) Prior Publication Data
US 2022/0230395 A1 Jul. 21, 2022

Related U.S. Application Data

(60) Provisional application No. 63/199,662, filed on Jan. 15, 2021.

(51) Int. Cl.
*G06T 19/00* (2011.01)

(52) U.S. Cl.
CPC .................. *G06T 19/00* (2013.01)

(58) Field of Classification Search
CPC ....... G06T 5/002; G06T 5/003; G06T 7/0012; G06T 19/00
See application file for complete search history.

(56) References Cited

U.S. PATENT DOCUMENTS 9,384,531 B2 7/2016 Yahata et al.
2010/0228129 A1* 9/2010 Osumi .................. A61B 8/4483
600/443

OTHER PUBLICATIONS

C. Chan, R. Fulton, D. D. Feng and S. Meikle, "Median non-local means filtering for low SNR image denoising: Application to PET with anatomical knowledge," IEEE Nuclear Science Symposuim & Medical Imaging Conference, 2010, pp. 3613-3618.

* cited by examiner

*Primary Examiner* — Sam Bhattacharya (57) ABSTRACT

Systems and methods include determination of an entropy value associated with each of a plurality of voxels of a three-dimensional image, determination, for each of the plurality of voxels, of a respective filter based on the entropy value associated with the voxel, wherein a first filter determined for a first voxel associated with a first entropy value is different from a second filter determined for a second voxel associated with a second entropy value different from the first entropy value, application, for each of the plurality of voxels, of the respective filter to a value of the voxel to generate a replacement value for the voxel, and generation of a filtered three-dimensional image based on the generated replacement value of each of the plurality of voxels.

20 Claims, 9 Drawing Sheets

ENTROPY-DEPENDENT ADAPTIVE IMAGE FILTERING

CROSS-REFERENCE TO RELATED APPLICATIONS

This application claims the benefit of U.S. Provisional Patent Application No. 63/199,662, filed Jan. 15, 2021, the contents of which are incorporated herein for all purposes.

BACKGROUND

According to conventional positron-emission-tomography (PET) imaging, a radiopharmaceutical tracer is initially introduced into a patient body. Radioactive decay of the tracer generates positrons which eventually encounter electrons and are annihilated thereby. The annihilation produces two photons which travel in approximately opposite directions.

A ring of detectors surrounding a portion of the body (e.g., the torso) detects photons emitted therefrom. A coincidence is identified when two detectors disposed on opposite sides of the body detect the arrival of two photons within a particular coincidence time window. Because the two "coincident" photons travel in approximately opposite directions, the locations of the two detectors determine a Line-of-Response (LOR) along which an annihilation event may have occurred. The LORs of the identified coincidences may be used to reconstruct a PET image of the portion of the body.

Due to the relatively low number of coincidences (e.g., in comparison to a number of attenuated x-rays received during computed tomography (CT) imaging), PET images often exhibit low signal-to-noise ratios. These low ratios inhibit clinical interpretations based on the delineation of internal structures. Conventional systems therefore apply processing to reconstructed PET images in an attempt to reduce the noise therein.

Traditionally, a Gaussian filter may be applied to a PET image to reduce its noise. Such a filter smooths edges and regions of interest within the image, thereby decreasing the visual delineation of structures such as small lesions. Moreover, the actual raw voxel values of the original PET image (i.e., the PET quantitation), which have biochemical significance used in diagnosis, prognosis, and subsequent treatment, are not preserved. Non-local means filtering is an alternative to Gaussian filtering, and has been used to reduce noise while preserving the quantitation of an original PET image. However, such filtering also reduces the contrast of edges, which reduces the level of detail surrounding regions of interest, such as organs and lesions.

Modifications to non-local means filtering include filters in which the target voxel of a kernel acquires a weight within an associated filtering sum only if its surrounding region is identical to that of any reference voxel within the kernel. While this modification may address some of the shortcomings of traditional non-local means filtering, the prerequisite condition is unlikely to occur in PET images, limiting its effectiveness in the case of PET images.

According to another filtering method, anatomical information of an associated CT image is used to locate region boundaries within the PET image. A traditional non-local means filter is then applied, but the strength of the filter is suppressed within identified regions of interest. This method requires the acquisition of a CT image either immediately before or immediately after the PET acquisition, very accurate registration between the CT and PET images, and manual or automatic segmentation of the CT image to determine the region boundaries. Each of these requirements increases complexity, cost and susceptibility to error.

Improved systems for filtering a reconstructed PET image are desired. Such systems may be applicable to any other image data acquired using any other imaging modality.

DETAILED DESCRIPTION

The following description is provided to enable any person in the art to make and use the described embodiments. Various modifications will remain apparent to those in the art.

Generally, some embodiments suppress filtering strength based on voxel entropy. Since image regions which exhibit enhanced detail, such as boundaries, organs, and lesions, are typically associated with increased entropy, the strength of the filter applied to voxels in those regions is lower than the strength of the filter applied to voxels in other regions.

In some examples, the entropy of every voxel in an image is calculated. The entropy of each voxel is then used to determine a filtering associated with the voxel. For example, and as will be described in detail below, the value of a non-local means filtering strength h for each voxel may be determined as the product of a maximum filtering strength value $h_{max}$ and an inverse of the entropy of the voxel, wherein the entropies of all voxels are normalized to pre-specified bounding values. The filtering determined for each voxel is applied to each voxel to generate a replacement value for each voxel. A filtered PET image is then generated based on the replacement values of the voxels. Embodiments may efficiently remove noise from an image while substantially preserving details and PET quantitation of important regions.

Embodiments also advantageously do not require multi-modal registration or segmentation. Also, since the calculation of entropy is computationally vectorizable, the calculation can be performed quickly via a sequence of vector and matrix operations using modern computing methods. Moreover, because entropy is a general concept and may be calculated for voxels of any image, embodiments are not limited to PET images and are suitable for any image modality.

Figure 1:
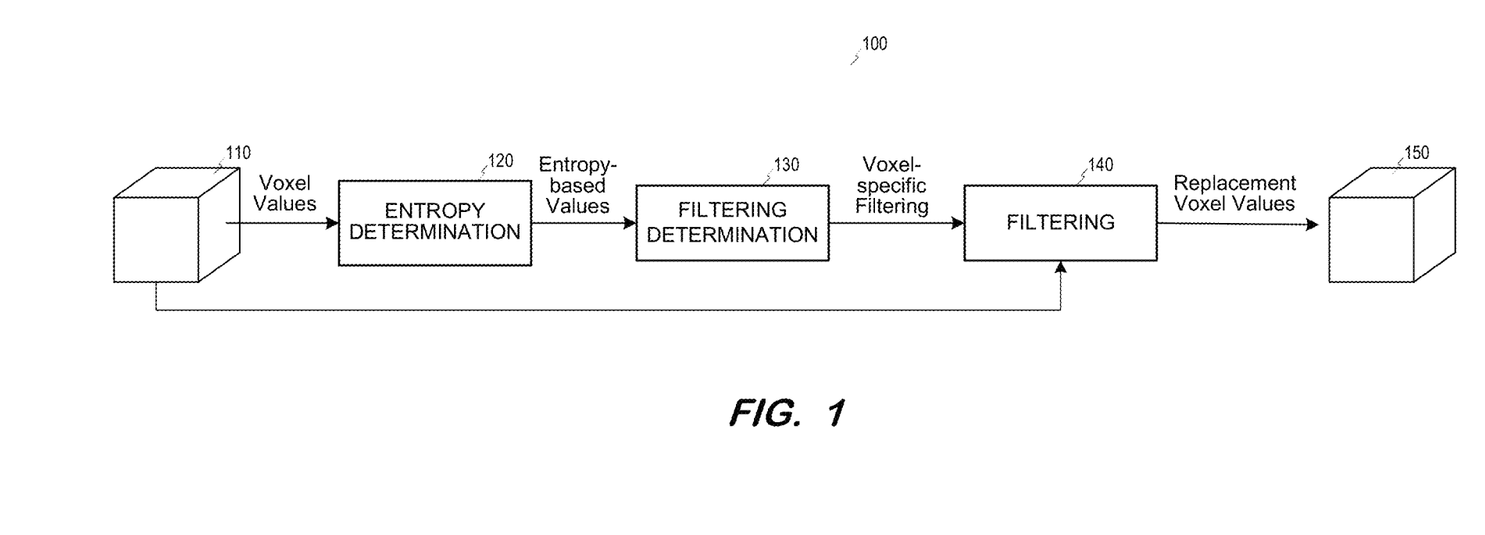
FIG. 1 is a block diagram of an architecture to filter an image according to some embodiments.

FIG. 1 is a block diagram of architecture 100 to filter an image according to some embodiments. The illustrated elements of architecture 100 may be implemented using any suitable combination of computing hardware and/or software that is or becomes known. In some embodiments, two or more elements are implemented by a single computing device. One or more elements may be implemented as a cloud service (e.g., Software-as-a-Service, Platform-as-a-Service).

Three-dimensional image 110 may comprise a set of voxels having a known physical relationship to each other (e.g., via coordinates of a common three-dimensional space), and one or more values associated with each voxel. The values may comprise any type of numerical value of any unit. The voxel values of image 110 may be in units of light intensity, color space parameters, etc. and may represent any physical quantity. In the case of a PET image, each voxel is associated with a value in units of Becquerel(Bq)/ml and represents a concentration of radioactivity over time. Image 110 may be acquired, or reconstructed from data acquired, via any imaging modality.

Entropy determination component 120 determines an entropy associated with each voxel of image 110 based on one or more voxel values of image 110. Entropy determination component 120 may determine the entropy associated with each voxel using any technique that is or becomes known. In some embodiments, the entropy of a voxel is a measure of the possible variations in intensity within a kernel centered on the voxel. According to some embodiments, entropy $Z_i$ of the ith voxel is calculated as:

$$Z_i \equiv -\sum_j P(v_j)\log(P(v_j))$$

where $P(v_j)$ is the probability that voxel value $v_j$ is encountered within a kernel of specified size centered on the ith voxel, and the sum is taken over all distinct voxel values $v_j$ within the kernel.

Entropy determination component 120 outputs values based on the determined voxel-specific entropies. In some embodiments, component 120 outputs an entropy of each voxel and, in other embodiments, component 120 outputs an inverse entropy (i.e., $Z_i^{-1}$) for each voxel. These output values may be normalized such that they are bound between specified values. For example, entropies determined for all voxels may be normalized to a given range, such that the inverse of the normalized entropies are also bound. Embodiments are not limited to these alternatives.

For each voxel, filtering determination component 130 determines a filtering to apply to the voxel based at least on the entropy-based value which was determined for the voxel by entropy determination component 120. Generally, the filtering applied to a first voxel associated with a first entropy-based value may be different from the filtering applied to a second voxel associated with a second entropy-based value. The difference in filtering between the two voxels is related at least in part to the different entropy-based values associated with each voxel.

Filtering may comprise calculating a replacement value for a voxel based on the voxel value and on a filtering equation. In some embodiments, the entropy values are used to determine a value of a parameter used in a filtering equation which is subsequently applied to each voxel value. The entropy values may be used to determine values of two or more parameters of such a filtering equation. In some embodiments, a first filtering equation is used to filter voxels associated with a first range of entropy-based values, and a second filtering equation is used to filter voxels associated with a second range of entropy-based values. Additionally, one or more parameters of the first or second equation may be determined based on the value of a particular voxel to be filtered.

The voxel-specific filtering determined by component 130 is passed to filtering component 140. Filtering component 140 applies the appropriate voxel-specific filtering to each voxel to generate a replacement value for each voxel. Image 150 may then be generated by substituting the original value of each voxel of image 110 with its determined replacement value.

Figure 2:
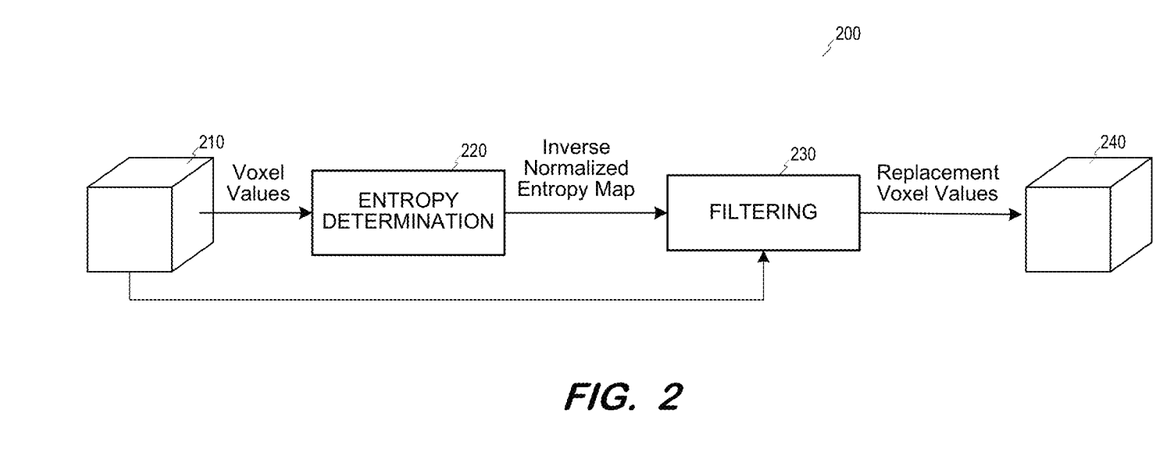
FIG. 2 is a block diagram of an architecture to filter an image according to some embodiments.

FIG. 2 illustrates architecture 200 to filter an image according to some embodiments. Architecture 200 may comprise a specific implementation of architecture 100, but embodiments are not limited thereto.

As described with respect to image 110, image 210 may comprise any three-dimensional image including voxels and values associated with each voxel. Entropy determination component 220 determines an entropy associated with each voxel of image 210 in any suitable manner, based on one or more voxel values of image 210. Entropy determination component 220 may also normalize the determined entropies such that the values thereof are bound (e.g., between 1 and 10), and determine an inverse (e.g., $Z_i^{-1}$, bound between 0.1 and 1) of each normalized entropy. The inverse normalized entropies associated with the voxels may be referred to as inverse normalized entropy map, and output to filtering component 230.

Filtering component 230 determines a replacement value for each voxel based on the inverse normalized entropy map, and image 240 consists of voxels having the replacement values. In some embodiments, filtering component 230 applies a same filtering equation to each voxel value to determine all replacement values, but, for a given voxel, a value of a parameter of the filtering equation is calculated based on the inverse normalized entropy associated with the voxel.

For example, filtering component 230 may apply a non-local means filtering equation to determine a replacement value for each voxel. As will be described in more detail below, the non-local means filtering equation may include a parameter h which is related to a strength of the filtering applied by the non-local means filtering equation. Some embodiments of filtering component 230 may determine h for filtering a given voxel as equal to a product of the inverse normalized entropy associated with the given voxel and a predetermined maximum $h_{max}$. Accordingly, voxels associated with a low normalized entropy, e.g., 1 (and a high inverse normalized entropy, e.g., 1), are filtered using a larger value of h than voxels associated with a higher entropy, e.g., 10 (and lower inverse normalized entropy, e.g., 0.1).

Figure 3:
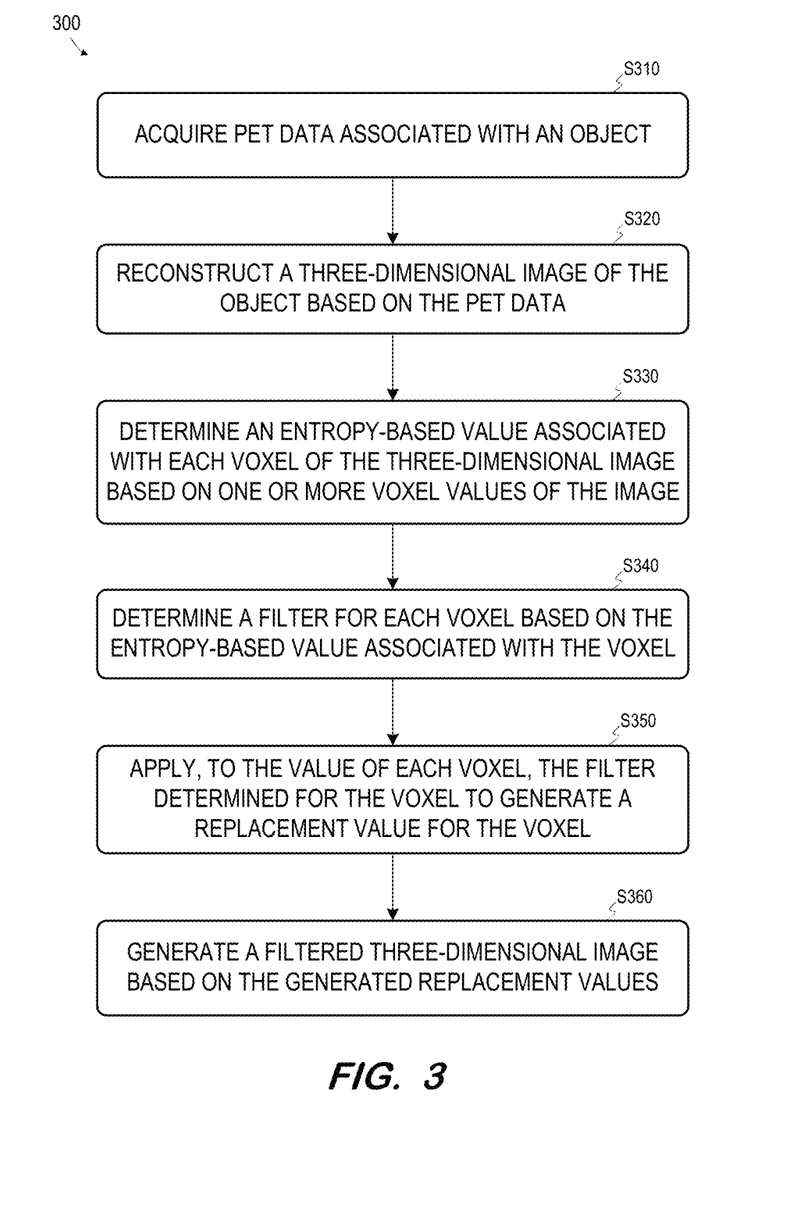
FIG. 3 comprises a flow diagram of a process to filter a PET image according to some embodiments.

FIG. 3 comprises a flow diagram of process 300 to filter a PET image according to some embodiments. As mentioned above, embodiments are not limited to PET image data. Process 300 and other processes described herein may be executed using any suitable combination of hardware and software. Software program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more microprocessors, microcontrollers, processing cores, and processor threads. Embodiments are not limited to the examples described herein.

PET data associated with an object is acquired at S310. In a typical PET data acquisition, a radionuclide tracer such as fluorodeoxyglucose (FDG) is injected into an object prior to the scan. Detectors surrounding the object detect the arrival of photons resulting from annihilations occurring within the object and coincidences are identified based on the arrivals. PET data is generated which associates each identified coincidence with the two detector crystals which received the photons of the coincidence, the time of the coincidence and, in the case of TOF data, the difference in photon arrival times. The PET data may include additional data associated with each coincidence and with the PET scan in general.

A three-dimensional image of the object is then reconstructed based on the PET data as is known in the art. In some embodiments, the reconstruction uses an attenuation map of the object, which may be generated based on anatomical information derived from a prior CT scan of the object. As is known in the art, the PET data may be corrected for randoms and scatter prior to reconstruction.

Rather than perform S310 and S320 substantially contemporaneously with the remaining steps of process 300, embodiments may simply receive at S330 a stored three-dimensional PET image which reconstructed in the past by the same entity performing S330 to S360 or by another entity, based on PET data previously acquired by the same or other entity.

Figure 4:
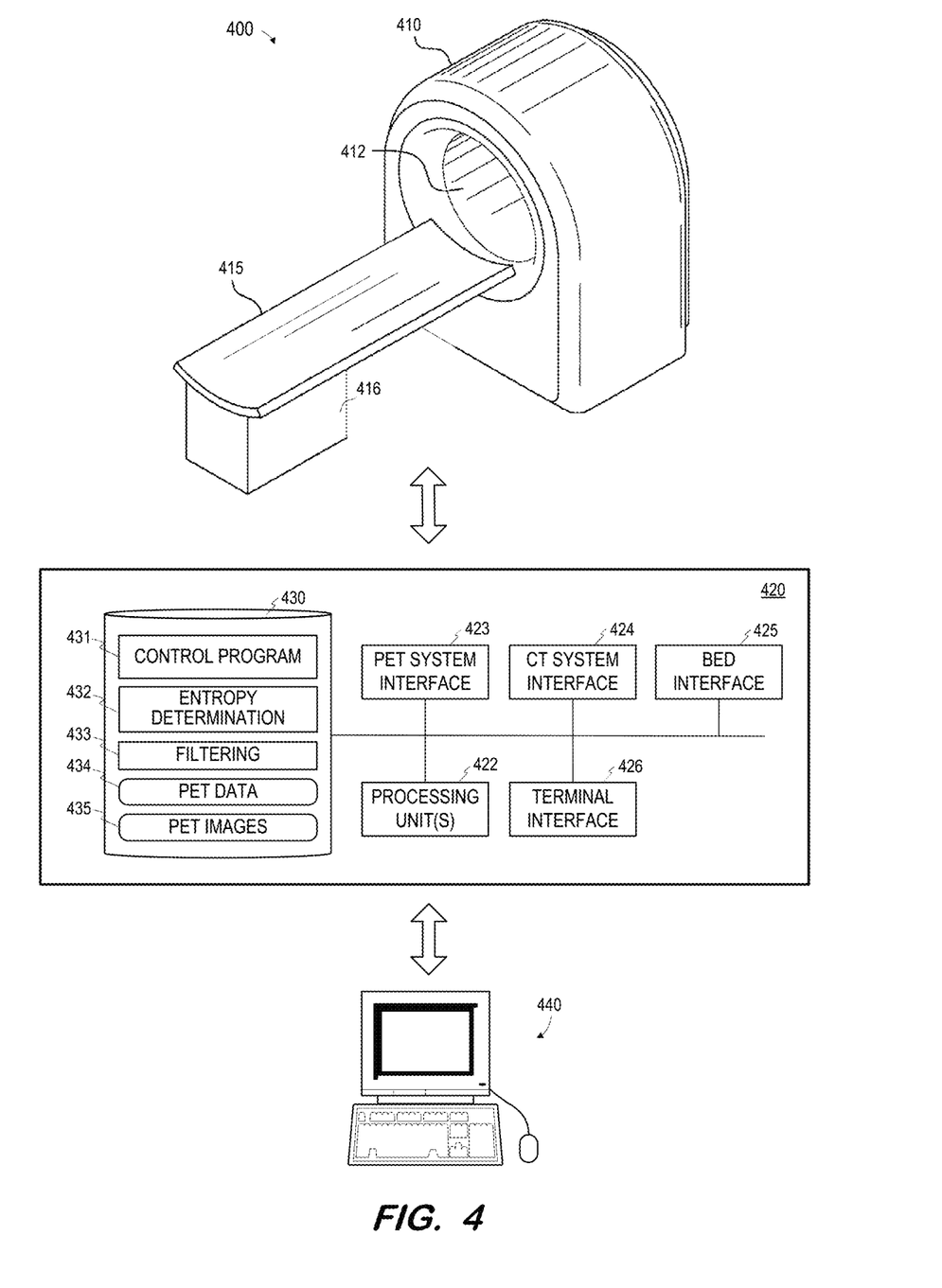
FIG. 4 is a block diagram of a PET/CT imaging system according to some embodiments.

FIG. 4 illustrates PET system 400 to execute one or more of the processes described herein. Embodiments are not limited to system 400.

System 400 includes gantry 410 defining bore 412. As is known in the art, gantry 410 houses PET imaging components for acquiring PET image data. The PET imaging components (not shown) may include an arbitrary number of adjacent and coaxial rings of detectors, and with each detector comprising any number of scintillator crystals and electrical transducers. The scintillator crystals of each detector receive 511 keV photons which result from annihilation events and, in response, create photons having energies of a few electron volts. The electrical transducers convert these low-energy photons to electrical signals. According to some embodiments, the electrical transducers may comprise, for example, silicon-based photomultipliers (SiPMs), photo-multiplier tubes (PMTs), or semiconductor-based detectors.

In some embodiments, scanner 400 is a PET/CT scanner and also includes CT imaging components for acquiring CT image data. The CT imaging components may include one or more x-ray tubes and one or more corresponding x-ray detectors as is known in the art.

Bed 415 and base 416 are operable to move a patient lying on bed 415 into and out of bore 412 before, during and after imaging. In some embodiments, bed 415 is configured to translate over base 416 and, in other embodiments, base 416 is movable along with or alternatively from bed 415. Movement of a patient into and out of bore 412 may allow scanning of the patient the PET imaging elements of gantry 410. In the case of a PET/CT scanner, a CT scan may be conducted immediately before or after a PET scan while a patient remains in a substantially same position on bed 415. This approach facilitates registration of the CT data with the PET data.

Control system 420 may comprise any general-purpose or dedicated computing system. Accordingly, control system 420 includes one or more processing units 422 configured to execute processor-executable program code to cause system 420 to operate as described herein, and storage device 430 for storing the program code. Storage device 430 may comprise one or more fixed disks, solid-state random-access memory, and/or removable media (e.g., a thumb drive) mounted in a corresponding interface (e.g., a USB port).

Storage device 430 stores program code of control program 431. One or more processing units 422 may execute control program 431 to, in conjunction with PET system interface 423, bed interface 425, and monitor interface 427, control hardware elements to inject a radiopharmaceutical into a patient, move the patient into bore 412 past PET detectors of gantry 410, and detect coincidences occurring within the patient. The detected coincidences may be stored in memory 430 as PET data 434. Control program 431 may also be executed to reconstruct PET data 434 into a three-dimensional PET image 435 using any currently- or hereafter-known technique.

Entropy determination program 432 may be executed to determine a value based on the entropy of each voxel of a PET image 435 as described herein. Entropy determination program 432 may be executed to determine an entropy value, an inverse entropy value, a normalized entropy value, an inverse normalized entropy value, an entropy-related filtering parameter value, or any other suitable entropy-related value or values for each voxel.

Filtering component 433 may be executed to apply filtering to a PET image 435. Filtering may comprise determination of a replacement value of each voxel of the PET image 435. As described herein, the particular filtering applied to a given voxel may be dependent upon the entropy associated with the voxel. While entropy determination program 432 and filtering component 433 are illustrated separately in FIG. 4, either or both may comprise elements of control program 431 or another program in some embodiments.

PET images 435 may be transmitted via terminal interface 426 to terminal 440 for display. Terminal 440 may comprise a display device and an input device coupled to system 420. Terminal 440 may receive user input for controlling display of the data, operation of system 400, and/or the processing described herein. In some embodiments, terminal 440 is a separate computing device such as, but not limited to, a desktop computer, a laptop computer, a tablet computer, and a smartphone.

Each component of system 400 may include other elements which are necessary for the operation thereof, as well as additional elements for providing functions other than those described herein. Each functional component described herein may be implemented in computer hardware, in program code and/or in one or more computing systems executing such program code as is known in the art. Such a computing system may include one or more processing units which execute processor-executable program code stored in a memory system.

Returning to process 300, an entropy-based value associated with each voxel of the reconstructed three-dimensional image is determined at S320. The entropy-based value associated with a voxel is determined based on one or more voxels of the image. According to some embodiments, the entropy $Z_i$ of voxel $V_i$ is calculated at S330 as the negative of the sum of the product of the probability that a particular value $v_j$ is encountered within a kernel and the logarithm of the probability, or, as noted above:

$$Z_i \equiv -\sum_j P(v_j)\log(P(v_j))$$

The kernel may be 7×7×7 voxels in size, for example, but embodiments are not limited thereto.

Entropy $Z_i$ in this scenario may be considered a measure of the total number of variations in voxel intensity which exist in the vicinity of voxel $V_i$, i.e., a measure of an amount of detail centered on voxel $V_i$. Since boundaries, organs, and lesions are represented as highly detailed areas within a PET image, the voxels representing these structures tend to be associated with higher entropy values than other voxels.

An entropy-based value is determined for each voxel based on the determined voxel-specific entropies. Depending on the implementation of subsequent processing, the entropy-based value may be equal to the entropy of each voxel, inversely related to the entropy of each voxel, normalized, or otherwise determined.

At S340, a filter is determined for each voxel based at least on the entropy-based value which was determined for the voxel at S330. Determination of a filter for a voxel may comprise, for example, substituting the entropy-based value associated with the voxel for a corresponding parameter of a filtering equation, selecting one or more parameter values of a filtering equation based on the entropy-based value, or selecting one of several filtering equations based on the entropy-related value. In some embodiments, the filter determined for a voxel associated with a greater entropy is of lower strength than the filter determined for a voxel associated with a lesser entropy. Suppressing filtering strength in higher-entropy regions (e.g., boundaries, organs, and lesions) results in preservation of detail within these regions as compared to regions of lower-entropy (and lower detail), in which preservation of detail may be less important than in higher-entropy regions.

For each voxel, the determined filter is applied to the value of the voxel at S340 to generate a replacement value for the voxel. A filtered three-dimensional image is then generated at S360 by substituting the original value of each voxel of the original image with its determined replacement value.

Figure 5:
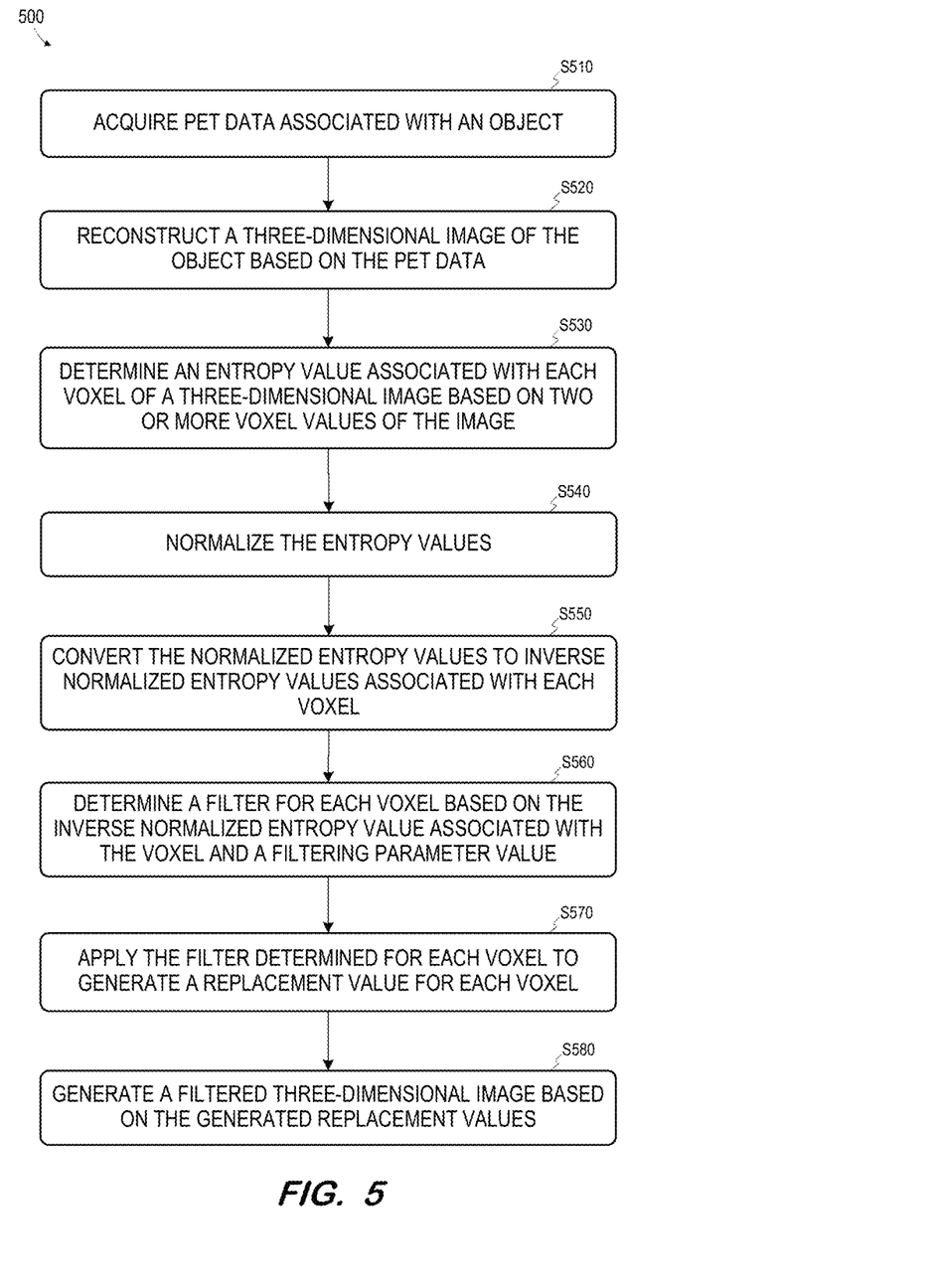
FIG. 5 comprises a flow diagram of a process to filter a PET image based on a user-selected filtering strength according to some embodiments.

FIG. 5 is a flow diagram of process 500 to filter a three-dimensional image according to some embodiments. Process 500 may comprise a specific implementation of process 300, and may be implemented by an architecture such as architecture 200, but embodiments are not limited to either scenario.

S510 and S520 of process 500 may proceed as described above with respect to S310 and S320 of process 300. At S530, an entropy $Z_i$ associated with each voxel $V_i$ of the three-dimensional image is determined in any suitable known manner, for example as described above. Next, at S540, the entropy value associated with each voxel is normalized such that all values are bound between a lower and upper bound. For example, each $Z_i$ is rescaled to the interval [1, 10]. Each normalized entropy value is then converted at S550 to an inverse entropy value (e.g., $Z_i^{-1}$). Continuing the example, the $Z_i^{-1}$ values corresponding to $Z_i$ values which were rescaled to the interval [1, 10] are necessarily bound between 0.1 and 1. Normalizing the entropy values at S540 ensures that the associated inverse entropy values determined at S550 will not be indefinite and thereby guarantees that every voxel will be filtered to some extent in the following processing.

Figure 6:
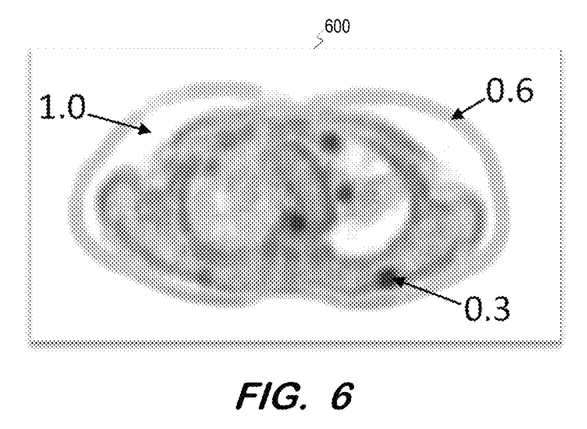
FIG. 6 illustrates an inverse normalized entropy map according to some embodiments.

The inverse normalized entropy values associated with the voxels may comprise a three-dimensional inverse normalized entropy map. FIG. 6 depicts a two-dimensional projection (i.e., a slice projection) of such a map according to some embodiments. Map 600 depicts higher inverse normalized entropy values with higher-intensity (i.e., lighter) pixels and lower inverse normalized entropy values with lower-intensity (i.e., darker) pixels. As shown, regions having more complex structure are associated with smaller inverse normalized entropy values.

A filter is determined for each voxel at S560 based on the inverse normalized entropy value associated with the voxel and a filtering parameter. For example, the same filtering equation may be determined for each voxel but, for a given voxel, a value of a parameter of the filtering equation is calculated based on the inverse normalized entropy value associated with the voxel. In some embodiments, the filtering equation is a non-local means filtering equation and the parameter is filter strength h:

$$V_{iR} = \sum_j \left( \frac{e^{\frac{-\|M_j - M_i\|^2}{h_i^2}}}{N_i} \right) V_j,$$

where $V_{iR}$ is the replacement value of the ith voxel, $M_i$ and $M_j$ are distributions of specified size centered on the ith and jth voxel, respectively, $h_i$ is the filtering strength for the ith voxel, and $N_i$ normalizes the sum of the exponential weights to 1. $V_j$ is the value of the jth voxel within the kernel of specified size centered on the ith voxel, and the sum is taken over all of the voxels within the kernel. According to some embodiments, the normalization factor $N_i$ is defined as follows:

$$N_i = \sum_j e^{\frac{-\|M_j - M_i\|^2}{h_i^2}}.$$

Figure 7:
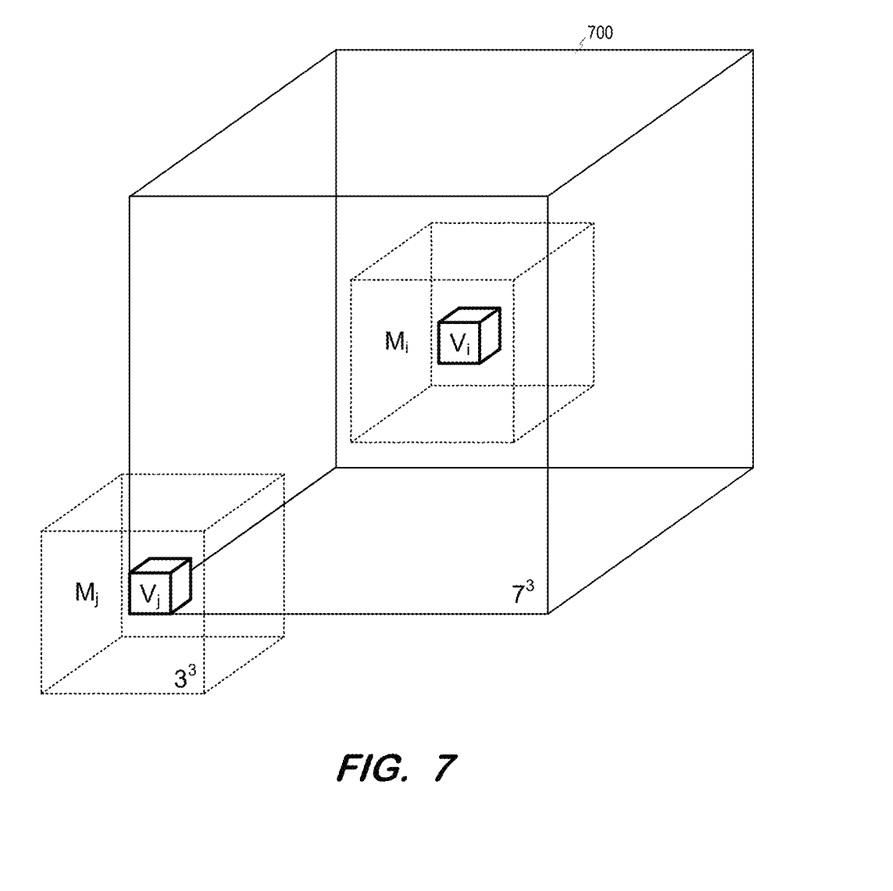
FIG. 7 illustrates a non-local means filtering algorithm according to some embodiments.

FIG. 7 illustrates application of a non-local means filtering equation within an example 7×7×7 image kernel 700. The filtering equation determines replacement value $V_{iR}$ of voxel $V_i$ at the center of kernel 700, denoted as a weighted sum over each other voxel $V_j$ within kernel 700. By virtue of the inverse exponential function in the equation above, the weight attributed to a particular voxel $V_j$ in the summation is high if the cubic region $M_j$ surrounding $V_j$ is similar to the cubic region $M_i$ surrounding $V_i$. Otherwise, the weight attributed to $V_j$ is lower. Accordingly, the resulting summation removes contributions from spurious noise maxima and minima within kernel 700. The degree to which the weights impact result can be enhanced or reduced by increasing or reducing parameter h, which appears in the denominator of the power of the exponential function. h may therefore be referred to as the filter strength.

In some embodiments, h is determined at S560 for each voxel as equal to a product of a predetermined maximum $h_{max}$ (e.g., 0.0075) and the inverse normalized entropy value associated with the voxel. Voxels associated with a low entropy value (and high inverse normalized entropy value, e.g., 1) are thereby filtered using a larger value of h than voxels associated with a higher entropy value (and lower inverse normalized entropy value). In other words, the degree to which a voxel will be filtered is directly related to its degree of homogeneity.

Next, at S570, the filter determined for each voxel is applied to the value of each voxel to generate a replacement value for each voxel. A filtered three-dimensional image is then generated at S580 based on the generated replacement values. The filtered three-dimensional image may be displayed to a clinician in any known format for presenting a three-dimensional image (e.g., slices, fly-through, exploded), and used for subsequent diagnosis, prognosis or treatment planning, for example.

Figure 8A:
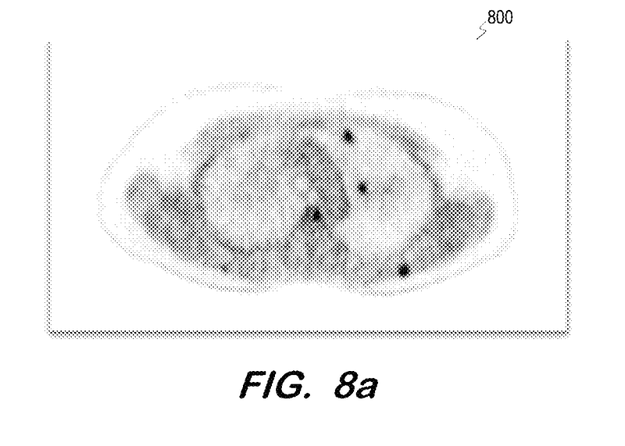
FIG. 8a is a two-dimensional unfiltered PET image.
Figure 8B:
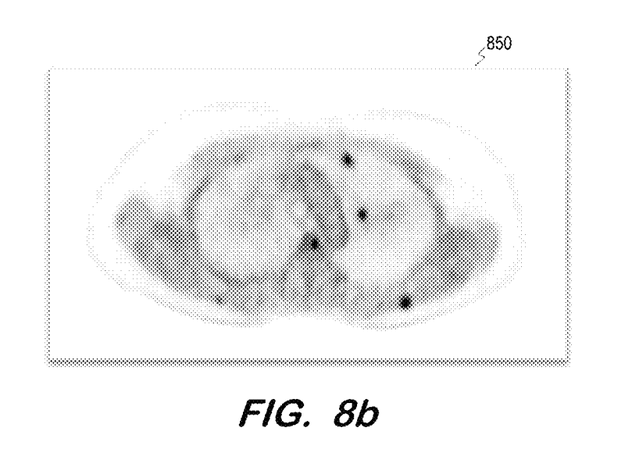
FIG. 8b is a two-dimensional filtered PET image based on the FIG. 8a image according to some embodiments.

FIG. 8a depicts two-dimensional PET slice image 800 prior to filtering according to some embodiments. As shown, many areas of image 800 depict noise. In comparison, FIG. 8b shows two-dimensional PET slice image 850 which consists of replacement values generated based on the voxel values of image 800 as described herein. The low-entropy areas of image 800 have been filtered to remove noise, while the delineation of structures in the higher-entropy areas remains satisfactory due to suppression of the filtering strength in those areas.

In some embodiments of process 500, $h_{max}$ may be selected by an operator in order to a desired maximum possible filtering strength. According to one non-exhaustive example, a "low" setting corresponds to $h_{max}$=0.005, a "medium" setting corresponds to $h_{max}$=0.0075, and a "high" setting corresponds to $h_{max}$=0.01.

Figure 9:
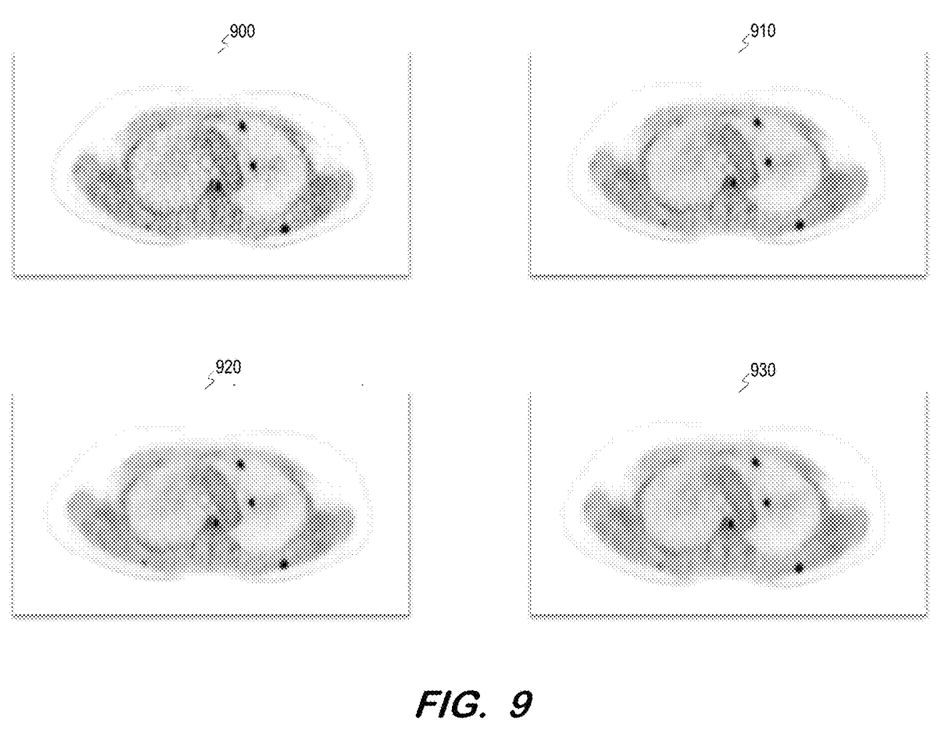
FIG. 9 includes two-dimensional PET images for illustrating filtering using different filtering strengths according to some embodiments.

FIG. 9 depicts two-dimensional PET slice image 900 prior to filtering according to some embodiments. Two-dimensional PET slice image 910 consists of replacement values generated based on the voxel values of image 900 and a low $h_{max}$ setting, two-dimensional PET slice image 920 consists of replacement values generated based on the voxel values of image 900 and a medium $h_{max}$ setting, and two-dimensional PET slice image 930 consists of replacement values generated based on the voxel values of image 900 and a high $h_{max}$ setting. As the value of $h_{max}$ increases, the noise within the low-entropy and high-entropy regions decreases. However, the noise within the high-entropy regions decreases to a lesser degree than in the low-entropy regions, thereby better preserving detail within regions of interest as compared to prior filtering systems.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a processing unit to:
determine an entropy value associated with each of a plurality of voxels of a three-dimensional image;
for each of the plurality of voxels:
determine a respective filter based on the entropy value associated with the voxel, wherein a first filter determined for a first voxel associated with a first entropy value is different from a second filter determined for a second voxel associated with a second entropy value different from the first entropy value; and
apply the respective filter to a value of the voxel to generate a replacement value for the voxel; and
generate a filtered three-dimensional image based on the generated replacement value of each of the plurality of voxels.

2. A system according to claim 1, wherein determination of an entropy value associated with each of a plurality of voxels of a three-dimensional image comprises determination of an inverse of the entropy value associated with each of the plurality of voxels, and
wherein determination of a respective filter based on an entropy value associated with a voxel comprises determination of a filter strength based on the inverse of the entropy value.

3. A system according to claim 2, wherein determination of a filter strength based on the inverse of the entropy value comprises determination of a product of the inverse of the entropy value and a value of a filter strength parameter.

4. A system according to claim 3, the processing unit to:
receive a selection of a filter strength setting; and
determine the value of the filter strength parameter based on the selected filter strength setting,
wherein the determined value of the filter strength parameter is a first value if the selected filter strength setting is a first setting and the determined value of the filter strength parameter is a second value if the selected filter strength setting is a second setting.

5. A system according to claim 2, wherein determination of an inverse of the entropy value associated with each of the plurality of voxels comprises normalization of the entropy value associated with each of the plurality of voxels and determination of an inverse of the normalized entropy value associated with each of the plurality of voxels, and
wherein determination of a respective filter based on an entropy value associated with a voxel comprises determination of a filter strength based on the inverse normalized entropy value.

6. A system according to claim 1, wherein determination of a respective filter based on an entropy value associated with a voxel comprises determination of a filter strength based on the entropy value and a value of a filter strength parameter.

7. A system according to claim 6, the processing unit to:
receive a selection of a filter strength setting; and
determine the value of the filter strength parameter based on the selected filter strength setting,
wherein the determined value of the filter strength parameter is a first value if the selected filter strength setting is a first setting and the determined value of the filter strength parameter is a second value if the selected filter strength setting is a second setting.

8. A method comprising:
determining an entropy value associated with each of a plurality of voxels of a three-dimensional image;
for each of the plurality of voxels:
applying a filter to a value of a voxel to determine a replacement value for the voxel, wherein a first filter applied to a first value of a first voxel is determined based on a first entropy value associated with the first voxel, and a second filter applied to a second value of a second voxel is determined based on a second entropy value associated with the second voxel, the first filter being different from the second filter and the first entropy value being different from the second entropy value; and
generating a filtered three-dimensional image based on the replacement value of each of the plurality of voxels.

9. A method according to claim 8, wherein the first filter applied to the first value of the first voxel is determined based on an inverse of the first entropy value associated with the first voxel, and the second filter applied to the second value of the second voxel is determined based on an inverse of the second entropy value associated with the second voxel.

10. A method according to claim 9, wherein the first filter is determined based on a product of the inverse of the first entropy value and a value of a filter strength parameter, and the second filter is determined based on a product of the inverse of the second entropy value and the value of the filter strength parameter.

11. A method according to claim 10, further comprising:
receiving a selection of a filter strength setting; and
determining the value of the filter strength parameter based on the selected filter strength setting,
wherein the determined value of the filter strength parameter is a first value if the selected filter strength setting is a first setting and the determined value of the filter strength parameter is a second value if the selected filter strength setting is a second setting.

12. A method according to claim 9, wherein the first entropy value and the second entropy value are normalized and the inverse of the first entropy value is an inverse of the normalized first entropy value and the inverse of the second entropy value is an inverse of the normalized second entropy value.

13. A method according to claim 8, wherein the first filter is determined based on the first entropy value and a value of a filter strength parameter, and the second filter is determined based on the second entropy value and the value of the filter strength parameter.

14. A method according to claim 13, further comprising:
receiving a selection of a filter strength setting; and
determining the value of the filter strength parameter based on the selected filter strength setting,
wherein the determined value of the filter strength parameter is a first value if the selected filter strength setting is a first setting and the determined value of the filter strength parameter is a second value if the selected filter strength setting is a second setting.

15. A non-transitory computer-readable medium storing processor-executable process steps which when executed by a processing unit of a computing system, cause the computing system to:
determine an entropy value associated with each of a plurality of voxels of a three-dimensional image;
determine, for each of the plurality of voxels, a respective filter based on the entropy value associated with the voxel, wherein a first filter determined for a first voxel associated with a first entropy value is different from a second filter determined for a second voxel associated with a second entropy value different from the first entropy value; and
apply, for each of the plurality of voxels, the respective filter to a value of the voxel to generate a replacement value for the voxel; and
generate a filtered three-dimensional image based on the generated replacement value of each of the plurality of voxels.

16. A medium according to claim 15, wherein determination of an entropy value associated with each of a plurality of voxels comprises determination of an inverse of the entropy value associated with each of the plurality of voxels, and
wherein determination of a respective filter based on an entropy value associated with a voxel comprises determination of a filter strength based on the inverse entropy value.

17. A medium according to claim 16, wherein determination of a filter strength based on the inverse of the entropy value comprises determination of a product of the inverse of the normalized entropy value and a value of a filter strength parameter.

18. A medium according to claim 17, the processor-executable process steps which when executed by a processing unit of a computing system, cause the computing system to:
receive a selection of a filter strength setting; and
determine the value of the filter strength parameter based on the selected filter strength setting,
wherein the determined value of the filter strength parameter is a first value if the selected filter strength setting is a first setting and the determined value of the filter strength parameter is a second value if the selected filter strength setting is a second setting.

19. A medium according to claim 16, wherein determination of an inverse of the entropy value associated with each of the plurality of voxels comprises normalization of the entropy value associated with each of the plurality of voxels and determination of an inverse of the normalized entropy value associated with each of the plurality of voxels, and
wherein determination of a respective filter based on an entropy value associated with a voxel comprises determination of a filter strength based on the inverse normalized entropy value.

20. A medium according to claim 15, wherein determination of a respective filter based on an entropy value associated with a voxel comprises determination of a filter strength based on the entropy value and a value of a filter strength parameter,
the processor-executable process steps which when executed by a processing unit of a computing system, cause the computing system to:
receive a selection of a filter strength setting; and
determine the value of the filter strength parameter based on the selected filter strength setting,
wherein the determined value of the filter strength parameter is a first value if the selected filter strength setting is a first setting and the determined value of the filter strength parameter is a second value if the selected filter strength setting is a second setting.

* * * * *